United States Patent [15] 3,660,032
Torrence                                                                                    [45] May 2, 1972

[54] PROCESS FOR REGENERATION OF SULFURIC ACID LADEN ACTIVATED CARBON

[72] Inventor: Samuel L. Torrence, Charleston, S.C.

[73] Assignee: Westvaco Corporation, New York, N.Y.

[22] Filed: July 10, 1970

[21] Appl. No.: 53,979

Related U.S. Application Data

[63] Continuation-in-part of Ser. No. 18,353, Mar. 10, 1970, abandoned.

[52] U.S. Cl. ..................23/225, 23/2 SQ, 23/178, 23/224, 252/411 S
[51] Int. Cl. ....................C01b 17/04, B01d 15/06
[58] Field of Search ...............23/224, 225, 226, 2 S, 2 SQ, 23/178, 181; 55/73; 252/411, 411 S

[56]         References Cited

UNITED STATES PATENTS 1,917,689  7/1933  Baum.......................................23/226
2,839,365  6/1958  Murray ..................................23/178 R
3,284,158  11/1966  Johswich..............................23/178 R

FOREIGN PATENTS OR APPLICATIONS 749,940  1/1967  Canada.....................................23/178

*Primary Examiner*—Oscar R. Vertiz
*Assistant Examiner*—Charles B. Rodman
*Attorney*—Ernest B. Lipscomb and Robert S. Grimshaw

[57]               ABSTRACT

A process for regenerating a sulfuric acid laden activated carbonaceous adsorbent by contacting the activated carbonaceous adsorbent at a temperature below about 350° F. with hydrogen sulfide in an amount of at least 3:1 mole ratio of hydrogen sulfide to adsorbed sulfuric acid to reduce the adsorbed sulfuric acid to elemental sulfur which remains adsorbed on the adsorbent, steam stripping at least 1 mole of elemental sulfur per 3 moles of hydrogen sulfide from the activated carbonaceous adsorbent and recovering the steam stripped elemental sulfur. When it is desired to strip less than all of the elemental sulfur from the activated carbonaceous adsorbent the remaining sulfur may be reduced with hydrogen to produce hydrogen sulfide for use in reducing the adsorbed sulfuric acid.

5 Claims, No Drawings

PROCESS FOR REGENERATION OF SULFURIC ACID LADEN ACTIVATED CARBON

This application is a continuation-in-part of co-pending U.S. application Ser. No. 18,353 filed Mar. 10, 1970 and now allowed.

BACKGROUND OF THE INVENTION

This invention relates to a process for removing sulfur oxides from gas streams by adsorption onto a carbonaceous adsorbent and to regenerating the adsorbent by recovering elemental sulfur therefrom. More specifically, this invention relates to an improved process for recovering sulfur formed during regeneration of a sulfuric acid laden activated carbonaceous adsorbent.

The necessity for removal of sulfur oxides from power plant effluents for air pollution control has brought forth many proposals for stack gas recovery processes. Use of the term "sulfur oxides" is, for the purpose of this invention, meant to include both sulfur dioxide and sulfur trioxide. Of these processes only a few have been developed seriously and even fewer have been tested on a commercial scale. These processes fit into three types: adsorption, absorption and catalytic oxidation. This invention is concerned with adsorption processes using activated carbon, which processes have heretofore possessed inherent disadvantages. In all the adsorbent processes employing activated carbon, sulfur dioxide is oxidized by excess air and water in the flue gas stream to sulfuric acid, which remains adsorbed on the surface of the carbon. The main distinction among the various processes lies in the manner in which the activated carbon having sulfuric acid adsorbed thereon is regenerated to recover various sulfur-containing products for sale.

The regeneration processes are either wet processes involving washing the carbon with water to produce dilute sulfuric acid as the recovered product or dry processes involving chemical reduction of the adsorbed sulfuric acid. The disadvantage with the washing process is that the activated carbon adsorbent is wet and must be dried before reuse, if flue gas temperatures are to be maintained during adsorption. Another disadvantage is that dilute sulfuric acid is produced as the recovered product and must be further processed.

The most well known dry regeneration process is the Reinluft Process and uses the carbon adsorbent itself as the reducing agent, reacting at temperatures above 570° F. to produce sulfur dioxide and carbon dioxide according to reaction [1].

$$H_2SO_4 + \tfrac{1}{2}CO \rightarrow SO_2 + \tfrac{1}{2}CO_2 + H_2O \qquad [1]$$

This dry process has the advantage of producing a steam concentrated in sulfur dioxide which can be easily processed further to sulfuric acid or elemental sulfur. However, as can be seen by the stoichiometry of reaction [1] about two tenths of a pound of adsorbent, a char, is consumed or "burned off" for every pound of sulfur recovered as sulfur dioxide. In the development of the Reinluft Process, several disadvantages have become apparent which this invention overcomes. One disadvantage is that the process necessarily uses a low cost char having poor adsorption rates and sulfur dioxide capacity, thereby necessitating large and costly adsorber units. Another disadvantage is the high consumption of the adsorbent due to the chemical reaction at the high regeneration temperature and attrition losses, which factors add to the operating cost of the process.

It is these disadvantages which this invention have successfully eliminated. Therefore, it is the general object of this invention to provide a process for regenerating a carbonaceous adsorbent having sulfur oxides adsorbed thereon, as sulfuric acid, without consuming the carbonaceous adsorbent. A more specific object is to provide a continuous process for removing sulfur oxides from flue gas streams by adsorbing these oxides onto an activated carbon as sulfuric acid and contacting the sulfur acid laden activated carbon with hydrogen sulfide so as to reduce the sulfuric acid to elemental sulfur without consuming the carbonaceous adsorbent and further recovering at least a portion of the elemental sulfur from the carbon by steam stripping. Another object is to provide a multistage process for regeneration of sulfuric acid laden activated carbon by sequentially contacting the activated carbon with hydrogen sulfide to reduce the sulfur acid to elemental sulfur, steam stripping a portion of the sulfur from the activated carbon and contacting the remaining sulfur with a sulfur-reducing gas to produce hydrogen sulfide. Further objects, features and advantages of the invention will be evident from the following disclosure.

SUMMARY OF THE INVENTION

It has been found that removal of adsorbed sulfuric acid from a carbonaceous adsorbent, such as an activated carbon, may now be accomplished in a multistage process by first contacting at a temperature below 350° F. the sulfuric acid laden adsorbent with hydrogen sulfide in an amount of at least 3:1 molar ratio of hydrogen sulfide to adsorbed sulfuric acid to reduce the sulfuric acid to elemental sulfur, which adheres to the adsorbent, steam stripping and recovering at least a portion of the elemental sulfur. All or a portion of the elemental sulfur may be easily steam stripped at a temperature below 1,400° F., preferably about 600° F. and thereafter recovered in a sulfur condenser. In the preferred process of this invention 1 mole of elemental sulfur of every 4 moles of sulfur produced is steam stripped and the remaining sulfur is contacted in a successive stage with a sulfur-reducing gas, such as hydrogen, to convert the remaining sulfur to hydrogen sulfide for use in reducing the adsorbed sulfuric acid to elemental sulfur. The carbonaceous adsorbent may then be recycled to the adsorber.

DETAILED DESCRIPTION OF THE INVENTION

Sulfur oxide laden flue gas is passed countercurrent to a continuously moving carbon adsorbent and the sulfur oxides are adsorbed therefrom as sulfuric acid. The sulfur oxide removal efficiency of the process can be designed to be as high as required, for example, the gas stream as it passes to the atmosphere may be reduced to less than 5 p.p.m. of sulfur from an initial concentration of 1,000 to 50,000 p.p.m. However, for economic reasons, it is usually preferable to adsorb about 90° percent of the sulfur oxides from the gas stream.

Physical adsorption of sulfur dioxide by activated carbon at flue gas temperatures is very low, but sulfur trioxide by comparison is readily adsorbed. Consequently, satisfactory removal from the gas stream depends upon the activated carbon acting as a catalyst in the oxidation of sulfur dioxide to sulfur trioxide which is hydrolyzed to sulfuric acid if water vapor is present in the flue gas. The oxygen and water vapor necessary for the reaction are normally present in the flue gas, but they may be added if desired. The sulfuric acid thus formed adheres to the carbon surface and in this manner sulfur oxides are removed from the gas stream according to reaction [2] and the cleaned flue gas is exhausted to the stack.

$$SO_2 + \tfrac{1}{2}O_2 + H_2O \xrightarrow{carbon} H_2SO_4 \qquad [2]$$

One of the advantages of an activated carbon process is that sulfur oxide removal may be performed at flue gas temperatures. Consequently, adsorption of sulfur oxides may take place at temperatures up to about 350° F. The preferred temperature for adsorbing both sulfur dioxide and sulfur trioxide is between 200° and 260° F. However, in adsorber units where corrosion by sulfur trioxide is a problem, the adsorption of sulfur oxides may be performed sequentially, using a single carbonaceous adsorbent so as to first adsorb the sulfur trioxide while it is at a temperature above its dew point and then to oxidize and adsorb the sulfur dioxide.

The essence of this invention is that regeneration may be efficiently carried out by reducing the adsorbed sulfuric acid to elemental sulfur using at least a 3:1 molar ratio of hydrogen sulfide to adsorbed sulfuric acid and steam stripping to recover at least one mole of the four moles of sulfur produced.

The stoichiometry is described by the following reaction.

$$H_2SO_4 + 3H_2S \xrightarrow[\text{carbon}]{\text{activated}} 4S + 4H_2O \quad [3]$$

The carbon burn-off during this regeneration is negligible. All of the adsorbed sulfuric acid and hydrogen sulfide are converted to elemental sulfur which remains adsorbed on the activated carbon surface prior to steam stripping. It is believed that the carbon acts as a catalyst not only to the adsorption of sulfur oxides but in the regeneration as well. The regeneration may be started at ambient temperature and should be kept at temperatures below 350° F. for reaction [3] to occur and sulfur remain adsorbed on the carbon. As the temperature is raised above 350° F. a reaction favoring the formation of sulfur dioxide occurs.

As the stoichiometry of reaction [3] shows, four moles of sulfur are produced for every mole of adsorbed sulfuric acid. In order to recycle a "clean" or completely regenerated activated carbonaceous adsorbent it is necessary to remove and recover the elemental sulfur produced by reaction [3]. Either all the sulfur or a portion of the sulfur may be rapidly and satisfactorily removed from the adsorbent by contacting with steam at a temperature below 1,400° F. At temperatures above 1,400° F. the steam may react with the activated carbonaceous adsorbent. The preferred steam stripping temperature is about 600° F. The steam containing the elemental sulfur may be passed to a sulfur condenser for further processing.

In the preferred embodiment of this process the amount of steam contacting the elemental sulfur is controlled to limit the amount of sulfur removed to 1 mole of every 4 moles produced. The adsorbent having the remaining 3 moles of sulfur adhered to its surface is carried to a succeeding stage of regeneration to reduce the adsorbed sulfur to hydrogen sulfide. The adsorbed sulfur may be reduced by a variety of sulfur-reducing gases, but the preferred gas is hydrogen from a gas producer and the reaction is:

$$3H^2 + 3S \xrightarrow[\text{carbon}]{\text{activated}} 3H_2S \quad [4]$$

3 moles of hydrogen sulfide are required to reduce 1 mole of sulfuric acid; therefore, the amount of sulfur remaining on the activated adsorbent is controlled to react with three moles of hydrogen. The hydrogen sulfide formed by reaction [4] is carried to the first stage of regeneration for use in reaction [3]. The thus completely regenerated carbon is then recycled without any loss in effectiveness for adsorption of sulfur oxides. It is desirable to carry out reaction [4] at temperatures above 500° F. Further, it has been found that temperatures between 800° and 1,300° F. are particularly satisfactory for reducing the sulfur to hydrogen sulfide at a sufficiently short reaction time, but lower temperatures may be used if sufficient reaction time is allowed.

The complete regeneration is preferably conducted in succeeding stages by first a chemical reduction of adsorbed sulfuric acid to elemental sulfur by hydrogen sulfide, and secondly steam stripping one mole of elemental sulfur from the adsorbent and third the reaction of the remaining elemental sulfur with hydrogen to form hydrogen sulfide. Thus the hydrogen sulfide which is required for reduction of sulfuric acid in reaction [3] is formed within the system by reaction of adsorbed sulfur with hydrogen. The chemistry of the successive stages of regeneration may be illustrated thusly:

$$H_2SO_4 + 3\ H_2S \xrightarrow[\text{carbon}]{\text{activated}} 3\ S + H_2O + S(\text{steam stripped}) \quad [3a]$$

$$3\ H_2 + 3\ S \xrightarrow[\text{carbon}]{\text{activated}} 3\ H_2S \quad [4]$$

The advantages offered by this invention include the ability to use a process whereby burn-off of activated carbon may be virtually eliminated. A second advantage is the ability to use a carbon possessing superior adsorption rate and capacity characteristics. Recovery of sulfur by steam stripping has the advantage of producing a concentrated stream of sulfur which can be easily condensed to liquid sulfur. Another important consideration is that elemental sulfur can now be recovered directly without an external reactor such as a Claus unit as needed in the earlier described processes. The adsorption and regeneration may be carried out in a fixed bed system or a continuously moving bed system, but the preferred process utilizes a fluidized bed system. For the purpose of this invention the terms "adsorbed sulfuric acid" and "sulfuric acid laden" are construed to also include small amounts of adsorbed sulfur trioxide.

Although any carbonaceous adsorbent may be used in the process of this invention, a coal-based activated carbon is preferred. Since the regeneration procedure does not consume the activated carbon adsorbent, a highly activated, more effective hard carbon, may be used. Through the ability to use the more highly activated carbons, the throughput of gas per volume of carbon can be increased by five to seven times more than the throughput of activated char. This achievement means a significant reduction in the size of the adsorption equipment required for a sulfur dioxide recovery process. In addition, hard activated carbons are much less subject to abrasion than are chars, the result being lower attrition losses.

The practice of this invention may clearly be seen in the following examples.

EXAMPLE 1

An activated carbon containing 5.5 pounds of adsorbed sulfuric acid per 100 pounds of carbon was regenerated according to the process of this invention. Regeneration was carried out by exposing the sulfuric acid laden activated carbon to a stream of hydrogen sulfide gas at a concentration of 25 percent in a helium carrier. The helium was used as a carrier to simplify analytical procedures, but in practice any inert gas would be suitable. The regeneration temperature and space velocity for each of several runs are shown in the table below. The effluent gas stream was monitored for $SO_2$, $H_2S$, CO and $CO_2$. The amounts of gases were measured quantitatively and the amounts CO and $CO_2$ in the effluent gas stream were used to determine the amount of carbon burn-off. Analysis for CO and $CO_2$ showed that burn-off of the activated carbon burn-off was negligible.

| Run number | Space velocity vol. gas/ vol. C-hr. | Bed temperature, °F. Initial | Bed temperature, °F. Maximum | Sulfur loading lbs./100 lbs. C Inlet at $H_2SO_4$ | Sulfur loading lbs./100 lbs. C Outlet as El. S | Conversion of sorbed $H_2SO_4$ to sulfur, percent |
| --- | --- | --- | --- | --- | --- | --- |
| 1 | 500 | 200 | 208 | 5.5 | 21.6 | 98 |
| 2 | 500 | 260 | 300 | 5.5 | 20.8 | 95 |
| 3 | 500 | 300 | 340 | 5.5 | 19.6 | 89 |
| 4 | 1,000 | 260 | 305 | 5.5 | 20.6 | 94 |
| 5 | 1,000 | 300 | 340 | 5.5 | 16.4 | 75 |

As shown by the data, as long as the maximum bed temperature remained below 305° F., 94–98 percent of the sorbed sulfuric acid was converted to sulfuric acid. Only traces of sulfur dioxide could be observed coming from the reactor under these conditions. These data suggest that it should be possible to achieve essentially 100 percent conversion to elemental sulfur in the regenerator as shown by reaction [3].

A sample of activated carbon loaded with approximately 15 pounds of sulfur per 100 pounds of carbon was then steam stripped at 600° F. and the sulfur content was rapidly reduced to 1.6 pounds of sulfur per 100 pounds of carbon. The results thus show that steam stripping of sulfur laden activated carbon may be effectively used in combination with the hydrogen sulfide reduction of adsorbed sulfuric acid during regeneration.

EXAMPLE 2

As pointed out, it is preferable to steam strip only approximately 1 mole of sulfur per 4 moles produced to leave three moles of sulfur on the carbon for reaction with hydrogen to form the hydrogen sulfide sufficient to meet the requirement of reaction [3]. Thus, an activated carbon adsorbent having elemental sulfur adsorbed thereon was then passed to the second stage of regeneration where it was contacted with hydrogen gas starting at ambient temperature and increasing to 1,150° F. in 180 minutes. The space velocity was 145 bed volumes of gas per hour or a gas contact time of approximately 4 seconds at 1,150° F. An analysis of the effluent gas stream showed the hydrogen reacted with the sulfur according to reaction [4] to form hydrogen sulfide, thus removing substantially all of the sulfur from the carbon. The carbon burn-off was negligible.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

I claim:

1. A process for regenerating a carbonaceous adsorbent having sulfuric acid adsorbed thereon comprising: contacting said sulfuric acid laden carbonaceous adsorbent with at least 3 moles of hydrogen sulfide per mole of adsorbed sulfuric acid at a temperature below 350° F. to convert said sulfuric acid and hydrogen sulfide to elemental sulfur and water vapor, removing at least 1 mole of every 4 moles of elemental sulfur produced by steam stripping at a temperature below 1,400° F. and recovering the steam stripped sulfur.

2. The process of claim 1 further comprising, contacting said carbonaceous adsorbent containing adsorbed elemental sulfur with three moles of sulfur-reducing gas at a temperature between 800° and 1,300° F. to reduce said elemental sulfur to hydrogen sulfide, using said hydrogen sulfide to reduce the adsorbed sulfuric acid and recycling said carbonaceous adsorbent.

3. The process of claim 1 wherein said steam is at a temperature above about 600° F.

4. The process of claim 2 wherein said carbonaceous adsorbent is a coal-based activated carbon.

5. The process of claim 2 wherein said sulfur-reducing gas is hydrogen.

* * * * *